United States Patent [19]

Taig

[11] 4,186,774

[45] Feb. 5, 1980

[54] HYDRAULIC CONTROL DEVICE

[75] Inventor: Alistair G. Taig, South Bend, Ind.

[73] Assignee: The Bendix Corporation, Southfield, Mich.

[21] Appl. No.: 892,575

[22] Filed: Apr. 3, 1978

[51] Int. Cl.² ............................................. F15B 9/08
[52] U.S. Cl. .............................. 137/625.23; 91/375 R
[58] Field of Search ..................... 137/625.21, 625.23, 137/625.22, 625.24; 91/375 A, 375 R

[56] References Cited

U.S. PATENT DOCUMENTS 4,117,864 10/1978 Taig .................................. 137/625.23

Primary Examiner—Alan Cohan
Attorney, Agent, or Firm—Paul David Schoenle; Ken C. Decker

[57] ABSTRACT

A power steering device includes an input member, a sleeve and an output member such that rotation of the input member relative to the output member communicates pressurized fluid through the sleeve to provide a power assist during steering. At least one pin is disposed between the input member and the sleeve to define fluid paths through the device and limited rotation between the input member and the sleeve increases the fluid flow in one of the fluid paths and decreases the fluid flow in the other of the fluid paths. A groove in the sleeve and a slot in the input member receive the one pin. The one pin is normally maintained in spaced relation to the input member by means of an axial cutout in the slot. In order to control pressure buildup due to fluid flow between the pin and the input member slot, the pin or the input member are provided with axial recesses at the location where the pin is engageable with the input member slot when the input member is rotated relative to the sleeve.

2 Claims, 3 Drawing Figures

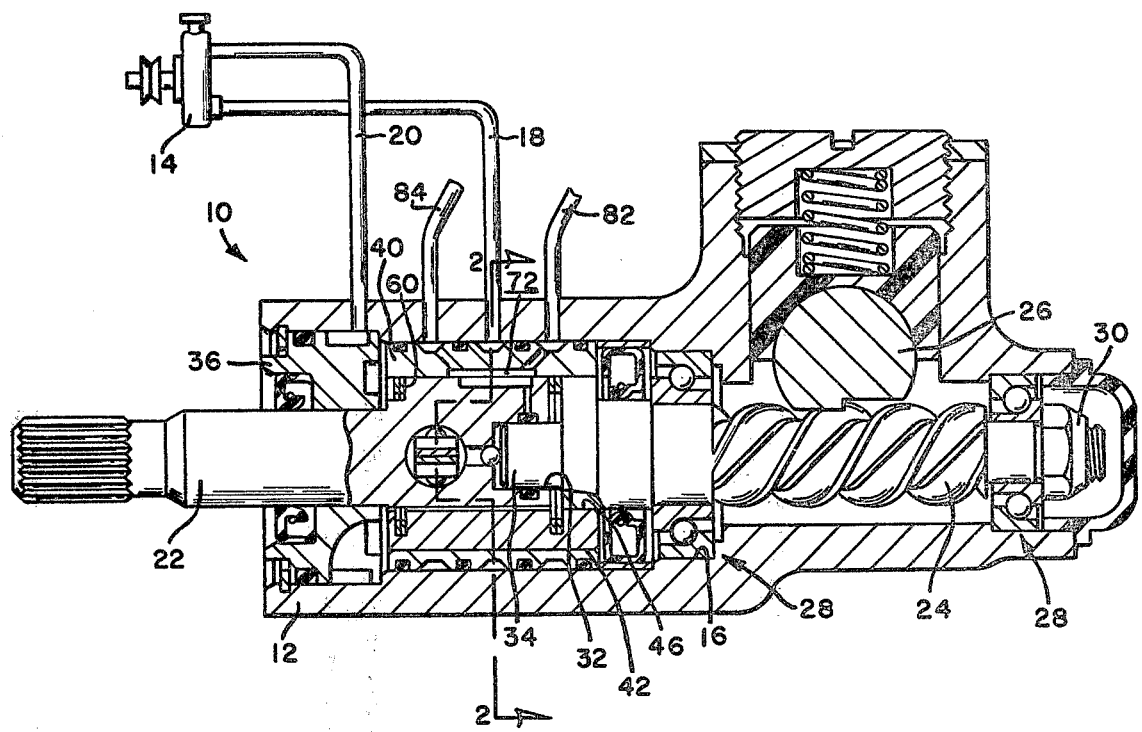
FIG. 1
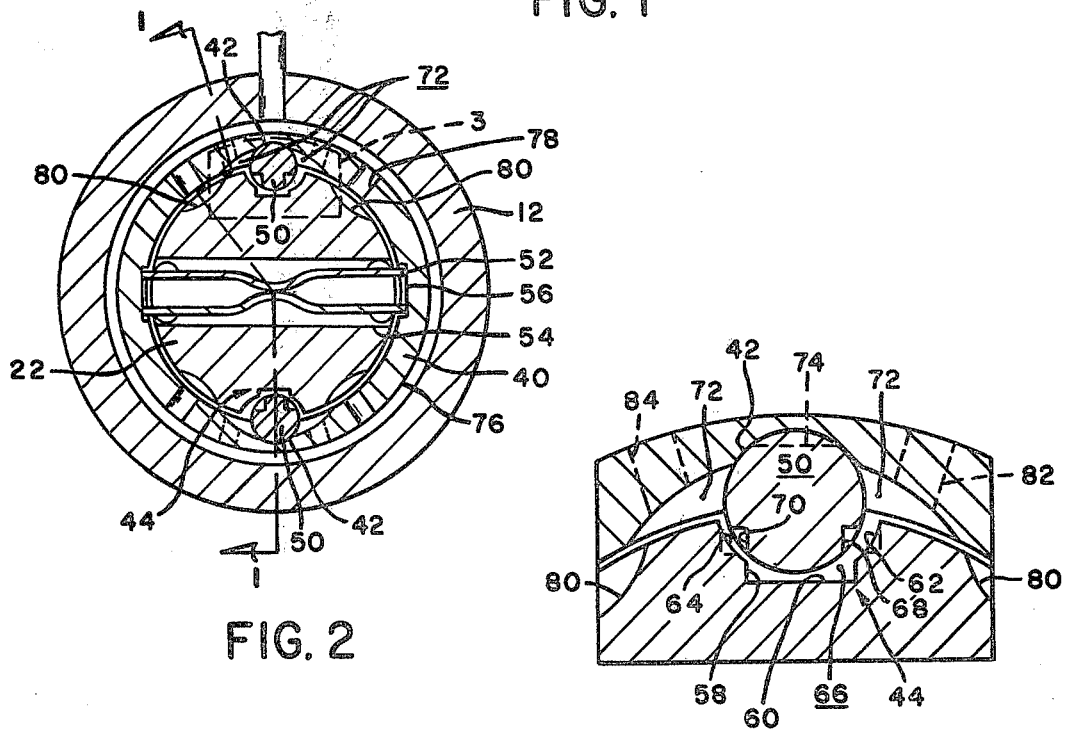
FIG. 2
FIG. 3

HYDRAULIC CONTROL DEVICE

BACKGROUND OF THE INVENTION

In my prior U.S. Pat. No. 4,057,079 and U.S. application Ser. No. 833,530, a fluid power control valve is described wherein a pin or projection between an input member and a sleeve or output member operates to control fluid communication to a hydraulic actuator, which provides a power assist to the movement of the output member. The pin also cooperates with the input member and the output member to transmit rotation of the input member to the output member when the fluid communicated to the hydraulic actuator fails to provide a power assist to the movement of the output member.

SUMMARY OF THE INVENTION

The present invention relates to an improvement in the foregoing control valve, and in particular, the control of fluid communication to the hydraulic actuator by the pin. The control valve comprises a sleeve with at least one groove and an input member with at least one slot, the groove and slot receiving the pin. In the normal non-steering position, the pin is maintained in engagement with the wall of the sleeve groove by means of an expansion ring as described in U.S. application Ser. No. 833,530, or by means of fluid pressure within the input member slot urging the pin radially outwardly, or by means of an interlocking fit with the sleeve groove. With the pin in engagement with the sleeve groove, the input member slot is dimensioned such that the pin is spaced from the input member to define a fluid passage between the pin and the slot.

In a preferrred embodiment the input member slot is cut out to form a bottom surface and a contoured surface is adjoining each side of the cutout. The contoured surface matches the outer surface of the pin opposite thereto so that the engagement between the pin and either contoured surface is substantially spread over the entire contoured surface. Either the pin or the contoured surface includes axially extending recesses to provide reaction characteristics as fluid flows between the pin and input member.

It is a primary object of the present invention to provide a control valve which is easy to manufacture and which provides a non-linear reaction in response to relative rotation between the input member and the sleeve.

BRIEF DESCRIPTION OF THE DRAWINGS

FIG. 1 is a schematic view partly in cross section illustrating a control valve made in accordance with the present invention and taken substantially along the line 1—1 of FIG. 2;

FIG. 2 is an enlarged cross-sectional view taken along line 2—2 of FIG. 1; and

FIG. 3 is an enlarged cross-sectional view of the circumscribed portion of FIG. 2.

DETAILED DESCRIPTION

In FIG. 1 a control valve 10 includes a housing 12 communicating with a fluid pressure source 14, such as a power steering pump. The pressure source 14 communicates with a stepped bore 16 by means of an inlet 18 and an outlet 20 returns fluid to the pressure source 14.

An input member 22 operatively connects with a steering wheel (not shown) on a vehicle for rotation relative to the housing 12 and an output member 24 cooperates with the input member 22, in a manner to be described hereinafter, to impart movement to a steering gear 26. The output member 24 rotates within the housing stepped bore 16 on a pair of bearings at 28 and a nut 30 axially retains the output member within the stepped bore 16. The input member 22 includes a blind bore 32 and a lug 34 on the output member 24 extends into the blind bore 32. A plug 36 closes one end of the stepped bore 16 and supports the input member 22 to permit rotation of the latter relative to the plug 36.

A sleeve 40 is rotationally disposed within the stepped bore 16. The sleeve cooperates with the input member 22 to communicate pressurized fluid from the pressure source to a hydraulic actuator (not shown) which is coupled to the steering gear in order to provide a power assist to the movement of the latter. Turning to FIG. 2, the sleeve 40 forms a pair of grooves at 42 and the input member 22 forms a pair of slots at 44 for receiving a pair of pins or projections 50. To resiliently oppose relative rotation between the input member 22 and the sleeve 40, a spring 52 extends from a bore 54 on the input member to engage a cutout 56 on the sleeve 40.

As the bottom pin 50 and the top pin 50 operate in the same manner, the following description will proceed with reference to the top pin 50; however, the features herein are equally applicable to the bottom pin.

Turning to FIG. 3, the input member slot 44 is cut out at 58 to form a bottom surface 60 and a pair of contoured surfaces 62 and 64 adjoin the cutout. In the normal idle steering position illustrated in FIG. 3 the pin 50 is spaced from the input member 22 to define a space 66 therebetween. Axially extending recesses 68 and 70 are formed on the pin 50 to control the flow of fluid from the window openings at 72 on the sleeve to the axial cutout 58. The particular shape of the recesses 68 and 70 is dependent upon the desired pressure reaction against the input member 22 when the latter is rotated relative to the sleeve. With the input member rotated clockwise relative to the sleeve, the left contoured surface 64 opposes the outer surface of the pin 50 and the left recess 70. The contoured surfaces are shaped to mate with the outer surface of the pin 50, so that when the contoured surfaces are engaging the pin 50, the engagement therebetween is over the entire contoured surface.

Although the recesses 68 and 70 are illustrated as being formed on the pin 50 it is also possible to form the axially extending recesses on the contoured surfaces 62 and 64 as illustrated in phantom in FIG. 3. Moreover, it is possible to provide the pin and groove 42 with matching shoulders as illustrated in phantom at 74 in FIG. 3 to restrain the pin from rotating relative to the sleeve.

MODE OF OPERATION

During operation of the power steering pump 14, pressurized fluid is communicated from the inlet 18 to a sleeve outer groove 76. The pressurized fluid within the sleeve outer groove 76 is communicated through sleeve radial passages 78 to input member indentations at 80. As the indentations 80 circumferentially overlap the sleeve window openings at 72, the pressurized fluid communicates with ports 82 and 84 which are axially disposed from the sleeve outer groove 76. Consequently, in the non-steering position illustrated in FIG. 1, substantially equal amounts of pressurized fluid are communicated to opposite sides of the hydraulic actuator via ports 82 and 84. With equal pressures on opposite sides of the hydraulic actuator, no power assist is imparted to the steering gear or output member. Pressurized fluid is also communicated to the cutout 58 and from there fluid flows axially to the end of the input member for return to the power steering pump via outlet 20.

When the input member 22 is rotated clockwise relative to the sleeve 40, viewing FIG. 3, the left indentation 80 is opened to the left window opening 72 to increase the flow of fluid thereto while the opening between the right indentation 80 and the right window opening 72 is decreased. In addition, the contoured surface 64 is urged toward the pin 50 while the contoured surface 62 is moved away from the pin 50. Therefore, fluid flow restriction between the surface 64 and pin 50 is increased while fluid flow restriction between the surface 62 and pin 50 is decreased. In this rotated position of the input member 22 the pressure of the fluid communicated via port 84 is increased while the pressure of the fluid communicated via port 82 is decreased in order to create a force in the hydraulic actuator, thereby providing a power assist to the movement of the steering gear.

As the contoured surface 64 approaches the pin 50 when the input member 22 is rotated clockwise, the increasing pressure between the contoured surface 64 and the pin 50 creates a dynamic reaction against the contoured surface to resist the clockwise rotation of the input member. This resistance provides feel or feedback to a vehicle operator. The amount of feedback depends on the shape and size of the recesses 68 and 70 on the pin 50. In addition, if the amount of feedback which results from a particular configuration of recesses is undesirable, it is easy to replace the pin 50 with a pin having a different configuration for the recesses 68 and 70.

Although the foregoing description proceeds with reference to the drawings, there are many variations and modifications which fall within the scope of the present invention as measured by the appended claims.

I claim:

1. In a control device having a rotatable input member, a sleeve having a bore receiving the rotatable input member and at least one pin disposed between the rotatable input member and the sleeve to limit the rotation between the rotatable input member and the sleeve, characterized by the sleeve including a groove and the rotatable input member including a slot opposite the groove, said one pin being disposed within the groove and slot, said slot including a bottom surface which is normally spaced from the pin and including surface portions which are contoured to the shape of the pin, said surface portions being normally spaced from matching surface portions on the pin when the latter is in an idle position, and one of said surface portions including notches facing said other surface portions.

2. In a control device having an input, a sleeve having a bore for receiving the input, and a pin disposed between the input and the sleeve, the input and sleeve having a slot and a groove, respectively, and the pin projecting into the slot and the groove to limit rotation between the input and the sleeve, the pin cooperating with the input and the sleeve to define at least two fluid flow paths which communicate with an outlet, and the input being rotatable relative to the sleeve to increase fluid flow through one of the fluid flow paths and to decrease fluid flow through the other of the fluid flow paths characterized by said pin being maintained in engagement with the sleeve groove to normally dispose the pin in spaced relation to the input and said pin including means to control fluid flow through the paths, said means including at least one axially extending recess on said pin opposing said input slot.

* * * * *